INVENTORS
RICHARD F. J. FILIPOWSKY
CONSTANTINE PRISEKIN

BY

George C. Kentom
AGENT

United States Patent Office 3,304,372

Patented Feb. 14, 1967

3,304,372

VOICE-DATA MULTIPLEXING SYSTEM FOR TRANSMITTING DATA DURING PAUSES IN THE VOICE SIGNALS

Richard F. J. Filipowsky and Constantine Prisekin, Rockville, Md., assignors to International Business Machines Corporation, New York, N.Y., a corporation of New York Filed June 28, 1963, Ser. No. 291,395
6 Claims. (Cl. 179—2)

This invention relates to multiplexing systems. More particularly the invention relates to systems which achieve the multiplexing of data signals over an existing voice communications channel.

The prior art is replete with multiplexing systems in which a communication channel is utilized for the transmission of both voice and data signals. Particularly prevalent are those systems in which an already bandwidth limited communications channel is frequency shared by both telegraph signals and voice signals. Such systems transmit the voice signals in one portion of the total frequency band of the channel, with the remainder of the bandwidth being allocated for the transmission of telegraph signals. Less than total allocation of the full bandwidth of an already limited communications channel leads, in the case of voice signals, to a deterioration of the quality of transmission, and, in the case of telegraph signals, to a limited transmission rate. Neither condition is desirable.

Accordingly, it is a prime object of this invention to multiplex data and voice signals over a transmission channel in an improved manner so that the full bandwidth is allocated to the transmission of either type of signal.

It is another object of this invention to provide new and improved time-multiplexing of data signals over a voice communication channel.

It is generally recognized that a normal telephone conversation contains a large number of gaps and pauses, in addition to intervals of no speech. Statistical studies have shown that in a full duplex voice communication, each of the two channels remains idle, on the average, of 67 percent of the time of the phone conversation. At the relatively high cost of today's communication channels, this idle time is simply an exorbitant waste of the capabilities of the system which are not fully utilized.

Accordingly it is another principal object of this invention to more efficiently utilize the capabilities of existing voice communication channels.

It is yet another object of this invention to utilize the idle time of a voice communication channel for the transmission of data signals.

Normally, the interspersed transmission of data in idle gaps of a phone conversation creates several problems which must be solved. Apart from the problems involved in monitoring a voice conversation to detect the idle gaps therein, any transmission of both voice and data signals over a transmission channel involves the more serious problem of detection at the receiver. That is, the receiver does not normally know in advance whether the next second of transmission will bring a voice signal or a data signal. Clearly, this dilemma becomes more acute when it is recognized that, any data signals would be completely unintelligible to a normal listener, while a data sink could not store voice signals. Thus, the receiver must send each type of received signal to its proper source, voice signals to a listener, and data signals to a data sink. Separation of voice signals from data signals in those prior art systems which have addressed themselves to this problem, has generally been accomplished by the use of delay devices in the receiver which, in effect, allow the receiver to make a decision on the basis of the type of signal already received and temporarily stored in the delay devices. The major disadvantages of delay devices are their relatively high cost and large physical size. A most common delay device, the delay line, has the further undesirable property of high attenuation.

Accordingly, it is yet another prime object of this invention to achieve the interspersed data transmission in idle gaps of a voice communication without the use of delay devices, particularly delay lines.

It is still another object of this invention to provide a voice-data multiplexing system in which the receiver station does not need a temporary storage device in order to separate the voice signals from the data signals.

It is a feature of the multiplexing system of the invention that voice transmissions will always have priority over any data transmission. Thus, data transmission once begun during the absence of any voice signal will cease a very short time after the voice signal reappears. The data transmission occurs at totally variable intervals, and for variable durations, since it is always subject to the overriding importance of the presence of voice signals. Thus, the system can aptly be described as an adaptable, asynchronous one.

According to one aspect of the invention, voice signals are normally gated onto a transmission channel at the transmitter but whenever gaps, exceeding a minimum interval are sensed in the voice signals at the transmitter, a data source is activated and data transmission begins with the dispatch of a keying signal over the transmission channel. The keying signal is then followed by the appearance of data signals. At the receiver, reception of the keying signal alerts the receiver and causes the subsequently received data signals to be read into a data sink.

When voice signals reappear at the transmitter, data transmission is ended and no voice signal is transmitted for a predetermined interval sufficiently small so as not to degrade the quality of the voice signal. Means at the receiver are responsive to this predetermined gap in the channel signal and, upon detection thereof, cause the receiver to switch to a voice reception mode, whereby voice signals subsequently received by the receiver are channeled to a listener's ear or a recorder. The receiver never switches to a data state until and unless the special keying signal sent by the transmitter to herald data transmission, has been received by the receiver for a predetermined minimum time interval. Thus, the normal path at the receiver, until the keying signal has persisted for its requisite duration, is one between the transmission channel and the voice sink, such as a listener's ear. Appearance of the keying signal at the ear creates an annoying chirp which must be eliminated.

The problem is overcome by the provision, in the receiver, of means which continually monitor the transmission channel. These means are adapted to detect an idle interval in voice transmission sufficiently long to have caused the transmitter to initiate a data transmission by the dispatch of the special keying signal. Upon the detection of such an idle interval, these means are prepared to inhibit the presently established path between the transmission channel and the listener's ear, so that the annoying reception of the keying signal is prevented.

The foregoing and other objects, features and advantages of the invention will be apparent from the following more particular description of a preferred embodiment of the invention, as illustrated in the accompanying drawings.

GENERAL STRUCTURE

Figure 1:
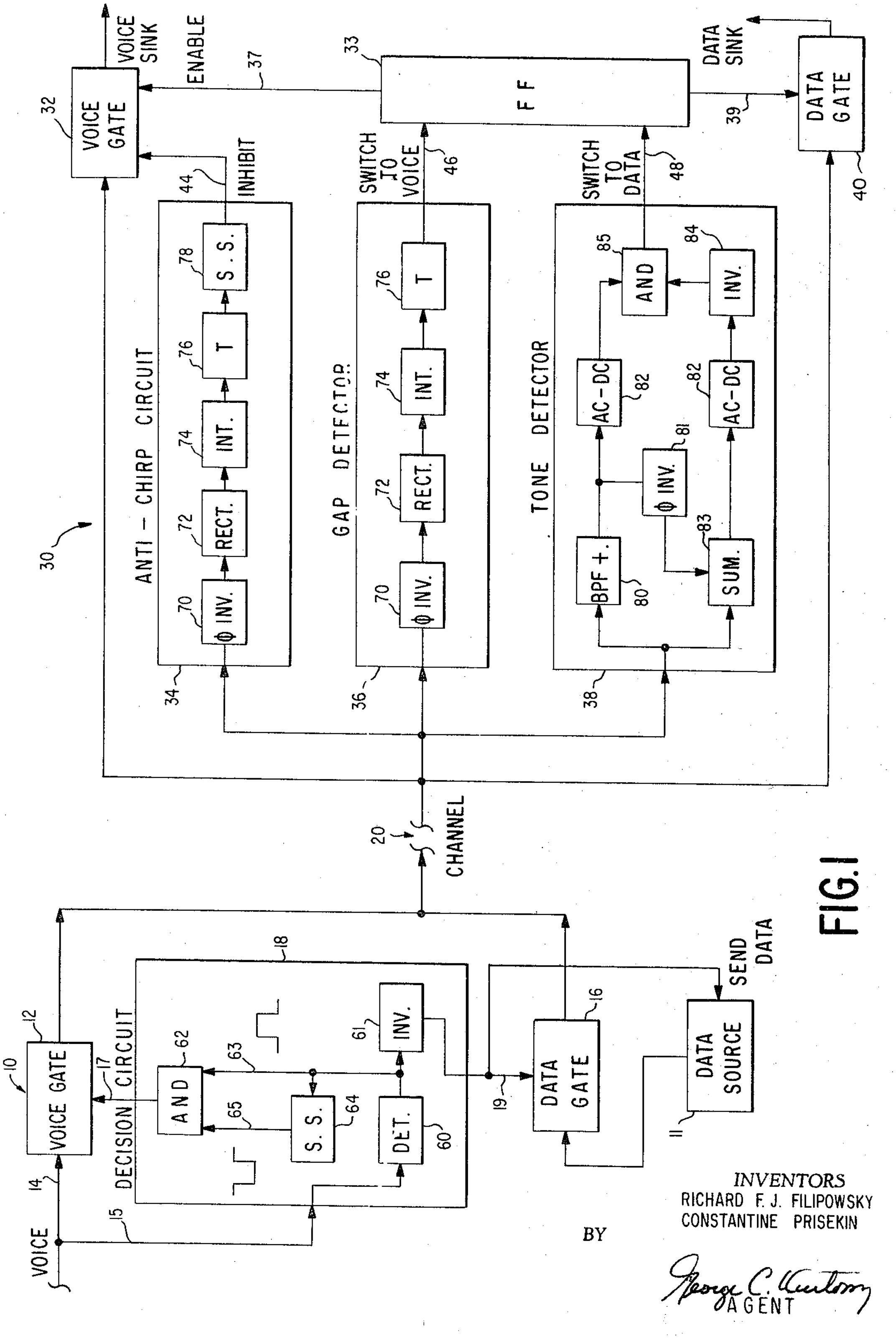
FIG. 1 is a generalized block diagram of the invention.

Referring now to FIG. 1, there is shown the overall block diagram of equipment embodying the invention. The transmitter 10 includes a voice gate 12 for passing voice signals appearing on line 14 onto the transmission channel 20. Similarly, a data gate 16 is provided between the transmission channel 20 and a data source 11. For the purposes of this invention, the particular nature of data source 11 is not important, but it may be mentioned that it may be a tape punched with digital data.

A decision circuit 18 controls the respective voice gate 12 and data gate 16 by gating signals via lines 17 and 19. Whenever a signal is present on line 17, no signal is present on line 19 and only voice signals are transmitted from line 14 onto the communication channel 20. On the other hand, when a signal is present on line 19, no signal is present on line 17, and only data, from data source 11, is allowed to pass onto the transmission channel 20.

The decision circuit 18 continually monitors the voice channel 14 via a conductor 15. Whenever voice signals are sensed on line 15, the decision circuit 18 provides a gating signal on line 17 to allow the passage of voice signals so sensed through the voice gate 12. When the decision circuit 18 recognizes gaps in the voice signal which exceed a predetermined minimum duration, a gating signal is provided on line 19 (simultaneously with the removal of the gating signal from line 17) which signal is simultaneously applied to the data source 11 to cause it to begin transmitting data, and to data gate 16 which is conditioned to pass any data signals. A more detailed description of the decision circuit 18 will be given later.

A receiver 30 is connected to the transmission channel 20 and applies all received signals, whether voice or data, to two gates, a voice gate 32 and a data gate 40. One or the other, but not both, of the gates 32 will be enabled to pass its respective type of signal in accordance with enabling signals generated by a switching network 33, which generates either a voice enabling pulse on line 37, or a data enabling signal on line 39, according to the information detected by a gap detector 36 and a tone detector 38. As will be hereinafter explained in more detail, gap detector 36 continually monitors the signals on transmission channel 20 and searches for a unique gap in signal transmission which would herald the arrival of voice-type signals. When gap detector 36 senses such a gap, it will emit a signal on line 46 which will condition the switching network 33 to enable voice gate 32 by the presence of a gating signal on line 37. Any signals thereafter received over transmission channel 20 pass through the voice gate 32 into a voice sink, which may be a listener, or an audio recorder. It is noted that gate 40 is not enabled, whenever gate 32 is, so that no voice signal transmission is allowed through the data gate 40.

The tone detector 38 in the receiver 30 also continually monitors signals on the transmission channel 20 for the appearance of another condition which would herald the arrival of data type signals. Upon the sensing of such a signal, tone detector 38 emits a signal on line 48 which conditions the switching network 33 to generate a data enabling pulse on line 39 and thereby pass any subsequently received data signals onto a data sink, such as a magnetic memory, for example.

A more detailed explanation of the anti-chirp circuit 34, as well as a more detailed explanation of the gap detector 36 and the tone detector 38 will hereinafter follow, after the description of the general operation of the circuit has made their function somewhat more apparent. Briefly, anti-chirp circuit 34 is a circuit which also continually monitors signals on the transmission channel 20 for the appearance of conditions therein which would render undesirable the passage of any signals from the transmission channel 20 through the normally enabled voice gate 32. For this purpose, the anti-chirp circuit 34, upon recognition of this condition which will be hereinafter explained below, emits an inhibiting pulse on line 44 which will override any enabling signal present on line 37 and thereby prevent the passage of any signals through voice gate 32 to the voice sink. A more detailed description will follow.

GENERAL OPERATION

Figures 2A, 2B, 2C, 3, 4A, 4B, 4C:
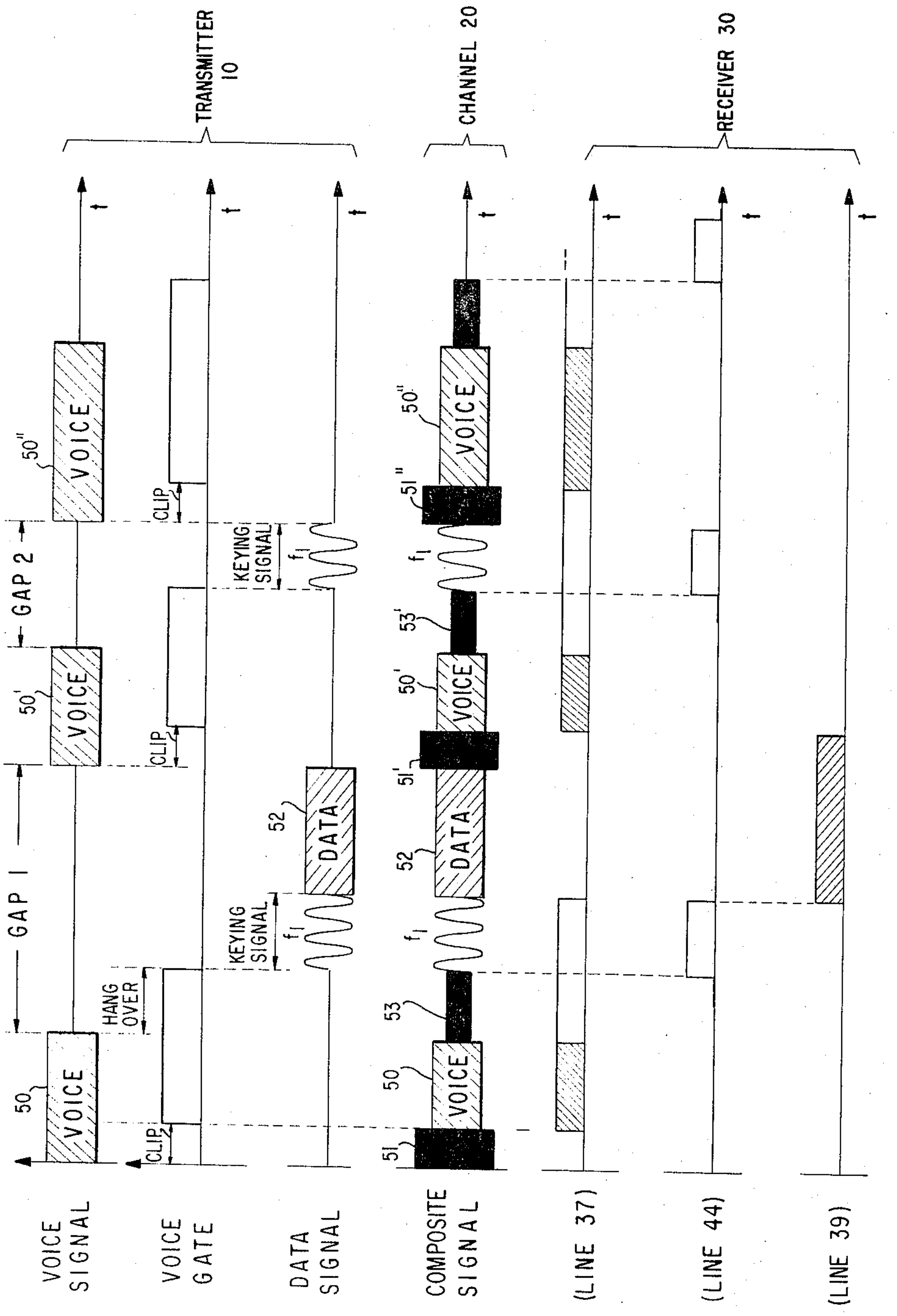
FIGS. 2A–2C are diagrams showing typical signal conditions in the transmitter.
FIG. 3 is a diagram showing typical signal forms on the data transmission channel.
FIGS. 4A–4C are diagrams showing typical signal conditions in the receiver.

Referring now to FIG. 1 and to FIGS. 2A–2C, the operation of transmitter 10 will be explained. Initially, it is assumed that no activity whatever is taking place on either voice line 14 or from data source 11, so that no signals are transmitted. Suddenly a voice signal 50, such as shown in the shaded portion in FIG. 2A, makes its appearance. This voice signal 50 is detected by the decision circuit 18 which delays the application of a voice condition signal on line 17 for a predetermined amount of time. This is shown in FIG. 2B, wherein the voice gate 12 (FIG. 1) is not conditioned until after a predetermined time interval, here called the clip interval, has elapsed. This clip interval is chosen so as not to degrade the nature of the voice signal 50 which will be transmitted over the data channel 20. (For example, the clip interval may amount to three milliseconds.) Each time that a new voice burst, such as 50′, reappears on line 14 (FIG. 1) after an arbitrary gap in voice transmission, the conditioning of voice gate 12 (FIG. 1) is delayed for the same clip interval.

Referring, for a moment to FIG. 3, which shows the composite signal on the transmission channel 20, this clip interval is denoted by heavily blacked portions 51, 51′, and 51″. Inspection of FIG. 3 reveals that the appearance of each voice signal burst 50 (50′, 50″) is preceded by the same clip interval, or gap, 51 (51′, 51″) during which the transmission channel 20 contains absolutely no signal (other than noise signals, which are irrelevant).

Returning now to FIG. 2A, after voice signal burst 50 has decayed, a voice signal silence begins. For the time being, the decision circuit 18 delays the removal of the conditioning signal on line 17 (FIG. 1). This results in the voice gate 12 being conditioned for an additional period, denoted as the hangover period in FIG. 2B. Briefly, this hangover period is provided by making the decision circuit 18 (FIG. 1) sufficiently slowly responsive to gaps which may normally occur during voice signals, but which are too short for any attempted data transmissions.

Further reference to FIG. 2A shows that the first gap, gap 1, between voice signal bursts 50 and 50′ is longer than the hangover period. As the decision circuit 18 has not detected the reappearance of any voice signals for at least as long as the hangover period, it now removes the voice gate conditioning signal on line 17 and immediately conditions data gate 16 with a signal on line 19. This signal is also applied to data source 11 and causes it to begin the transmission of data through the presently enabled data gate 16. However, before any actual data transmission takes place, the data source 11, as a means of heralding the incipient transmission of data to the receiver, proceeds to emit a special keying signal of a defined signal frequency, *f*1. This keying signal is shown in FIG. 2C as lasting for a predetermined duration. Since, as shown by FIG. 2A, the gap between voice bursts 50 and 50′ still persists, the keying signal *f*1 is transmitted through the enabled data gate 10, onto the transmission channel 20. After the data source 11 has sent the keying signal for a predetermined period, which, for example, may last for five milliseconds, data transmission is initiated. This data transmission is shown in FIG. 2C, by a shaded portion 52.

Referring again, for the moment to FIG. 3, which represents the composite signal in the transmission channel 20, the events so far described have resulted in the following conditions. Reading FIG. 3 from left to right, there was an idle gap 51, during which no signal was on the channel. This interval was followed by the transmission of a burst of voice signals 50, which, in turn, were followed by a shaded interval 53 during which no signal transmission took place. The time period 53 denoted in FIG. 3, is identical to the hangover period shown in FIG. 2B. After the occurrence of the gap 53, the keying signal *f*1 appeared for the required duration on the channel 20, and it was subsequently followed by the transmission of a group of data, denoted by the shaded block 52 on FIG. 3.

Returning now to FIG. 2A, reappearance of voice signals on line 14, as denoted by the voice burst 50′, causes the decision circuit 18 to block all further data transmission by removing the enabling signal on line 19. However, the voice gate 12 is not immediately enabled. Rather, the clipping interval persists before the decision circuit 18 enables voice gate 12. This results in the "transmission," so to speak, of an idle interval 51′ over the channel, as shown in FIG. 3. Thereafter, the voice signal burst 50′ is transmitted in the fashion as perviously described. Again, it is noted that after voice signals have ceased their appearance on channel 14, the voice gate 12 nevertheless remains conditioned, but no signal is transmitted over the channel, as shown by the shaded gap 53′ in FIG. 3.

The detection by the transmitter, of a second gap, shown as gap 2 in FIG. 2A, at least as long as the hangover period shown in FIG. 2B, results in the re-activation of data source 11 and the conditioning of data gate 16 as previously described. Again, data source 11 emits a keying signal of a chosen frequency *f*1 and it prepares itself for the subsequent transmission of data. However, as is shown in FIG. 2A, gap 2 between the end of voice signal burst 50′ and the reappearance of voice signal burst 50″ has turned out to be not sufficiently long for the keying signal to endure for its minimum required duration. The reappearing voice signal burst 50″ assumes control and causes decision circuit 18 to remove the conditioning signal on line 19. Voice transmission must take place again. It is clear that the reappearance of the voice signal 50″, after a gap far smaller than gap 1, has squelched the incipient data transmission. Voice is again transmitted over the channel 20 in a fashion as previously described, that is, reading FIG. 3 from left to right, the voice signal burst 50″ is preceded by a shaded blank interval 51″.

Returning now to FIG. 3, an inspection of events in the channel shows that the composite signal consists of voice transmission, represented by the area, 50, and interspersed with transmission of data signals 52, idle gaps 51 and 53, and keying signals of frequency *f*1. It is particularly noted that each voice transmission 50 (50′, 50″) is preceded by an idle gap 51 (51′, 51″) of predetermined duration. Similarly, each transmission of the keying signal *f*1 is likewise preceded by a predetermined interval 53 (53′) of predetermined duration. As will be seen later, the receiver and the circuit means therein are adapted to recognize the occurrence of each one of these unique events and cause the receiver to assume a state which will channel the subsequently received signal to its proper sink.

Turning now to FIGS. 1 and 4A and a description of the receiver operation, the occurrence of an idle gap 51 within the composite channel signal is recognized by the gap detector 36 in the receiver. Only when gaps of the duration of gap 51 are recognized by the gap detector 36, does it issue a SWITCH TO VOICE signal on line 46 which controls switching network 33 to enable the voice gate 32. As the voice gate is now enabled, the voice signal 50 which follows the gap 51, is transmitted therethrough to a voice sink.

After the voice signal 50 has disappeared from the channel, an idle interval 53 occurs and it is likely that it will be followed by the transmission of a subsequent keying signal *f*1. Since the voice gate 32 is still enabled, a path presently exists between the channel 20 and the voice sink, such as the listener's ear, and the reception of the keying signal is not desired since it creates an annoying chirping sound. For this reason, anti-chirp circuit 34 is so constructed as to detect gaps (since it is, ineffect, a gap detector) in the composite channel signal which are equivalent to gap 53. When such a gap is detected, the anti-chirp circuit 34 conditions itself to generate an inhibiting signal on line 44 immediately upon the appearance of any signal on the channel 20. FIG. 4B shows that the anti-chirp inhibiting pulse is generated substantially simultaneously with the appearance of the keying tone. This inhibiting pulse is applied to the voice gate 32 and proceeds to inhibit the gate from passing any signals on the channel 20 to the listener's ear, notwithstanding the presence of an enabling signal on line 37.

The receiver will not switch to the data mode (that is, enable data gate 36) until the keying signal *f*1 has endured for the requisite time, whereafter the tone detector 38 produces a SWITCH TO DATA signal on line 48 which automatically removes the conditioning signal from voice gate 32, and applies a conditioning signal to data gate 40, via line 39 (see FIG. 4C). A subsequent data transmission, as represented by block 52 in FIG. 3, is therefore allowed to pass through the conditioned data gate 40 to an appropriate data sink.

While the receiver has thus separated the data signal 52 from a composite channel signal and gated it to the data sink, data transmission at the transmitter has already been stopped and a new voice transmission 50′ is about to appear. However, as previously mentioned, this voice transmission is preceded by an idle interval 51′ on the data channel so that the gap detector 36 in the receiver, upon the detection of this particular gap 51′, recognizes that voice transmissions are about to be recived. Accordingly, gap detector 36 emits a SWITCH TO VOICE signal on line 46 (FIG. 4A) which reverts the switching network 33 to condition the voice gate 32 to pass the subsequently received voice signals 50′ to the voice sink. Again, as the voice gate remains enabled, the reappearance of a second gap 53′, causes anti-chirp circuit 34 to condition itself to issue an inhibiting pulse (see FIG. 4B) which would prevent the passage of the keying signal *f*1 through the presently enabled voice gate 32. Immediately upon the detection of any signal after the time interval 53′, anti-chirp circuit 34 generates an inhibiting pulse on line 44 whose duration is sufficiently long to prevent a chirp from reaching the listener's ear. This inhibiting pulse overrides the enabling pulse present on line 37 and prevents the voice gate 32 from passing the keying signal *f*1 to the listener's ear.

As previously mentioned, the rapid reappearance of the voice signal 50″ (FIG. 2A) has squelched the incipient data transmission so that even the keying signal *f*1 has not persisted over the requisite minimum duration. This, in turn, has prevented the receiver 30 from switching to the data mode, so that after the inhibiting pulse on line 44 ceases, all signals appearing on channel 20 (it is assured that they will be voice signals) are still gated through the presently enabled voice gate 32. Thereafter, events occur in a manner as previously described. That is, the transmitter 10 will utilize sufficiently long gaps between voice signals for data transmission and the receiver will proceed to channel each type of signal to its proper sink.

It should be mentioned that the above description has, for simplicity, but without limiting the invention, deliberately overlooked a factor which shall now be considered. The description has proceeded on the assumption that any initiated data transmission from data source 11 is interrupted almost instantaneously when voice signals 50 reappear to claim the transmission channel 20. It may happen, that this would interrupt a data transmission in the middle of a message block. This is undesirable. Accordingly, although the nature of the data transmission is not material to the invention, it should be pointed out that the message blocks are chosen of sufficiently small duration so that the maximum duration for the transmission of one entire block is not so long as to detain a voice signal from reclaiming the transmission channel for an excessive time period. In practice, an entire message block occupies no more than 17 milliseconds so that a voice signal is clipped for no more than the sum of this maximum delay plus the enforced clipping delay of 3 microseconds as represented by timing gap 51. Thus, allowing the completion of the initiated transmission of a data message, never results in more than a twenty millisecond delay, or clip, of the voice signal. Such a clip cannot be noticed by the human ear.

In addition, no mention is made in this application of the timing and synchronization aspects involved in the transmission of digital data. These are not material to the invention, and they will be readily apparent to those skilled in the art. The problem is really no different from the one which occurs in conventional digital data systems in which prescribed time periods are utilized for the transmission of digital data.

DETAILED DESCRIPTION

*Transmitter*

At the transmitter there are three essential elements, the voice gates 12, 16, and the decision circuit 18. The gates 12 and 16 are transmission gates of the linear, pedestal free type and they are familar to those skilled in the art. Therefore, only decision circuit 18 bears a closer inspection.

Decision circuit 18 has the major function of ascertaining the presence of voice signals on voice channel 14 and providing the respective enabling signals on lines 17 and 19 to allow respective enabling signals on lines 17 and 19 to condition their respective gates. Briefly, the decision circuit 18 comprises a voice detector 60 (to be more fully hereinafter described) responsive to the presence of voice for producing a conditioning signal on line 17 to open the voice gate 12. When voice is not detected, no enabling signal is present on line 17, and, an enabling signal is present on line 19 to open the data gate 16.

Assuming that no voice signals are present on the voice channel 14, there is no output from detector 60 and the inverter 61 provides an enabling signal on line 19. When voice reappears on chanel 14, the detector 60 produces an output signal (thereby removing the enabling signal from line 19) which is applied, via line 63, to one of the input terminals of AND circuit 62. The second, required input to AND circuit 62 is provided in a delayed fashion by the single shot circuit 64 which produces a pulse that lasts for a predetermined interval (equal to the clip interval 51 hereinbefore mentioned). As soon as the output from single shot circuit 64 returns to its up level on line 65, AND circuit 62 produces an enabling signal on line 17. This enabling signal has thus been produced a certain time interval after the detection of voice signals on the channel 14.

*Receiver*

Referring to FIG. 1, the receiver comprises three main functional blocks, namely, the anti-chirp circuit 34, the gap detector 36, and the tone detector 38. The general function of these elements has been explained before. That is, gap detector 36 is responsive to the clip interval 51 (see FIG. 3) which precedes each transmission of voice signals 50, for generating the switch to voice signals on line 46 which enable the voice gate 32 to pass subsequently received voice transmissions. The anti-chirp circuit 34 is responsive to gaps 53 (see FIG. 3) in the composite signal on channel 20 (FIG. 1). As mentioned before, the occurrence of gaps 53, in the composite signal, indicates the subsequent appearance of the keying signal $f1$ to indicate data transmissions. The passage of the keying signal is not desired through the presently enabled voice gate 32. Therefore, anti-chirp circuit 34, upon the recognition of a gap such as 53, is prepared to generate an inhibiting signal which is to be applied to voice gate 32. Tone detector 38 in turn, is responsive to the keying signal $f1$ to switch the receiver 30 to the data state, that is, to cause swiching network 33 to produce an enabling signal on line 39 to enable the data gate 40.

Since, except for features to be mentioned hereinafter, the anti-chip circuit 34, the gap detector 36, and the voice detector 60 at the transmitter, comprise essentially similar circuitry, the ensuing description will concern itself mostly with the nature of the voice detector 60 at the transmitter.

Figure 5:
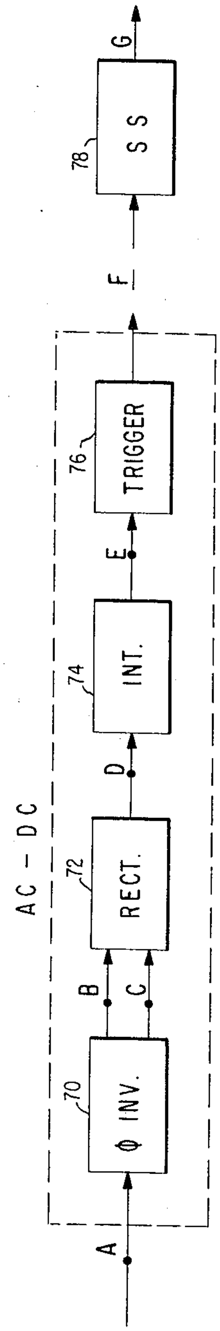
FIG. 5 is a more detailed diagram of circuitry used in the invention.

Referring now to FIG. 5, voice detector 60 comprises a phase inverter 70, a rectifier 72, an integrating network 74, and a trigger network 76. These circuits are all conventional and are familiar to those skilled in the art. FIGS. 6–12 illustrate signal conditions at respective points (A–G) of the circuitry shown in FIG. 5. For purposes of illustration, and without limiting the invention, simplified wave forms have been used to more clearly bring out the nature of the invention.

Figures 6, 7, 8, 9, 10, 11, 12:
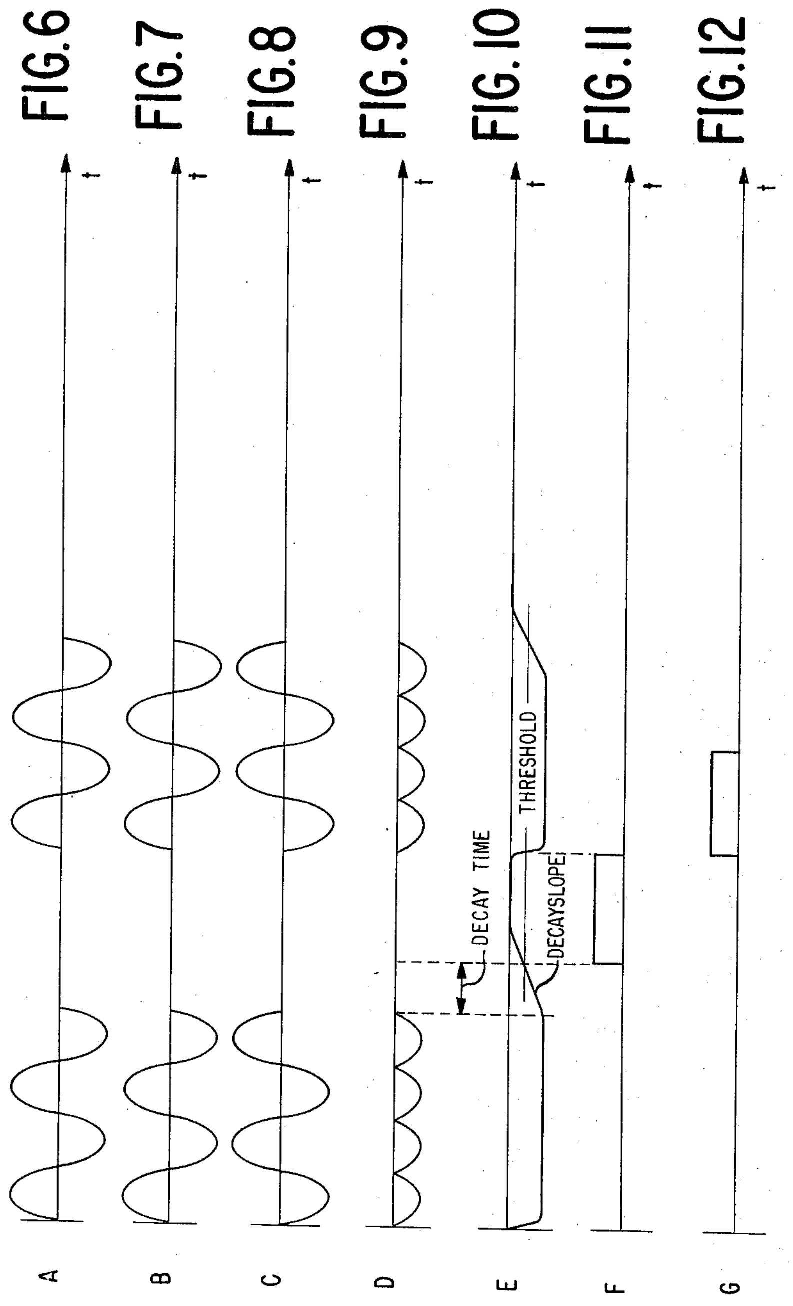
FIGS. 6–12 are diagrams showing illustrative signal conditions in the circuit of FIG. 5.

FIG. 6 shows the signal input A to the phase inverter 70. As can be seen, the signal is absent for an idle interval, after which it reappears. The output of phase inverter 70, on its two terminals B and C, is shown in FIGS. 7 and 8. Note that the output signal on terminal B is identical to the input signal A, but that the ouput signal C is the phase inverted form thereof. These signals are provided to the input of the rectifier circuit 72, which is a conventional full-wave rectifier. Circuit 72 provides the negatively rectified output signal D, as shown in FIG. 9.

The output of the rectifier 72 is provided to an integrating network 74, well known to those skilled in the art. The output of the integrator 74 is shown, in FIG. 10, as a negative level which will maintain itself for as long as the input signal D is present. After the signal D disappears (this represents the appearance of a gap between the signals A), the output of integrator 74 begins to decay. After a prescribed decay time, for which the integrating circuit 74 may be suitably designed by varying the decay slope, the output has reached the threshold level necessary to actuate the trigger circuit 76, which may be of the well-known Schmitt type. The trigger circuit 76 will remain in its newly set state, until the output of the integrator 74 passes through the threshold again, as shown in FIGS. 10 and 11. Note that the reappearance of an output from integrator 74, as shown in FIG. 10 corresponds to the reappearance of a signal at the input A of the phase inverter 70.

*Voice detector*

The preceding description of FIG. 5, has described circuitry which is present in the voice detector 60. A comparison between the state of trigger 76 (FIG. 11) and the signal condition on terminal A (FIG. 6) shows that the trigger circuit 76 is activated for the duration of the idle interval between the signals appearing on terminal A in FIG. 5. In other words, the state of the trigger circuit 76 indicates the presence, and absence, of signals on terminal A. This function is precisely that of the voice detector 60 (FIG. 1) whose function is to provide clear indications of the presence and absence of voice signals on channel 14.

The previous description has made clear the requirement for a hangover period, such as shown in FIG. 2B. Briefly, this hangover period is in the nature of a delayed response of the decision circuit 18 to gaps appearing in the signal from the channel 14. It should be apparent that the hangover time, shown in FIG. 2B, is chosen by the decay slope of (FIG. 10) of the integrating circuit 74 included in the voice detector 60. In other words, the decay time of integrating circuit 74 (FIG. 5) is that of the hangover period shown in FIG. 2B.

*Anti-chirp circuit*

As shown in FIG. 1, the anti-chirp circuit 34 comprises all the elements described in FIG. 5. That is, a phase inverter 70, a rectifier 72, an integrator 74, a trigger circuit 76, and, in addition, a single shot circuit 78. The operation of this circuit will now be described.

The operation of the anti-chirp circuit 34 with reference to the above elements, is identical except for two factors to be mentioned in which it differs from that of the voice detector 60. The first difference is in the amount of the decay time (FIG. 10) of the integrating circuit 74 in the anti-chirp circuit. This decay time is longer than that of the integrator at the voice detector 60, so that only the larger gaps 53 (see FIG. 3) are recognized. Again, the decay slope of the integrator circuit 74 is so chosen that the trigger 76 is activated after the detection of the interval 53. The trigger 76 in the anti-chirp circuit is again activated upon the reappearance of a signal, as shown by the FIGS. 10 and 11, where the integrator 74 crosses the activating threshold again. The second difference is that, in the anti-chirp circuit 34, the switching of trigger 76 controls a single shot circuit 78 which produces an output signal (see FIG. 12) that represents the inhibiting output signal of the anti-chirp circuit 34. The duration of the output signal from single shot circuit 78 is sufficiently long to inhibit voice gate 32 (FIG. 1) to prevent it from passing the undesired keying signal *f*1.

*Gap detector*

The function of gap detector 36 has been previously described as that of ascertaining gaps (51) in the composite signal which indicate the subsequent reception of voice signals. In order to make the gap detector 36 responsive to gaps of this predetermined length, the decay time constant of integrator 74 in the gap detector 34 is so chosen as to equal the clip interval 51, shown in FIG. 3. Thus, trigger circuit 76 at the gap detector is activated after an interval, such as 51, has appeared in the composite signal on channel 20. The operation of the rest of the circuitry is identical to that previously described for the elements in FIG. 5.

*Tone detector*

As previously mentioned, the tone detector 38 (FIG. 1) is responsive to the keying signal *f*1 which heralds the appearance of data signals, to switch receiver 30 to the data mode, that is, enable the data gate 36.

The invention has been described with reference to a keying signal *f*1 which is used to indicate the transmission of data. Although not limited thereto, the keying signal may comprise a signal frequency pure tone lying somewhere in the audio spectrum. It is possible that voice signals transmitted over the channel 20 (FIG. 1) may contain sufficient energy of a frequency equivalent to that of the keying tone, to falsely trigger the tone detector 38. To guard against this possibility, tone detector 38 responds to a signal having only *f*1 frequency. That is *f*1 frequency and no other frequency.

This function is accomplished by tone detector 38 through the means of circuitry shown in FIG. 1, which comprises a band pass filter 80 for passing only frequencies *f*1, a phase inverter 81, and a linear summing network 83. All these networks are familiar to those skilled in the art. The A.C.-D.C. circuits 82 shown in tone detector 38 are identical to the circuits enclosed in block lines, in FIG. 5. The inverter circuit 84, and the AND circuit 85 are entirely conventional.

In operation, the composite signal received over channel 20 passes into the tone detector 38 where it is filtered by the band pass filter 80. The output of the band pass filter is phase inverted by the phase inverter 81, whose output is then provided to the summing network 83, in addition to the composite signal. The output of band pass filter 80 is either absent, or there is a signal *f*1 at the output thereof. The summing network 83 proceeds to add the inverted output of band pass filter 80 to the signals which represent the composite signal. Now, if only the frequency *f*1 is present in the composite signal on the channel 20, the output of summing network 83 will be zero. At all other times, there will be an output signal from the summing network 83. The A.C.-D.C. circuits 82 essentially recognize the presence of signals to their respective inputs and provide sharp binary output levels necessary to fire the AND circuits 85. These circuits 82 and their operation have previously been described with reference to FIG. 5.

When there are other signals, in addition to *f*1, present in the composite signal on channel 20 the summing network 83 will always produce an output signal. The presence of a signal at the output of summing network 83 will prevent the activation of AND circuit 85, principally due to the action of the inverter circuit 84.

While the invention has thus been particularly shown and described with reference to a preferred embodiment thereof, it will be understood by those skilled in the art that various changes in form and detail may be made therein without departing from the spirit and scope of the invention.

What is claimed is:

1. A voice-data multiplexing system in which voice signals from a voice source and data signals from a data source are time multiplexed over a common transmission channel, as a composite voice data signal, comprising:

transmitter means, including a voice source and a data source;

means for normally inhibiting said data source until idle gaps in said voice signals exceed a predetermined first duration;

means responsive to the presence of voice signals for pre-empting any transmission of data from said data source, said means including means for resuming the transmission of voice signals a predetemined second duration after the appearance of said voice signals, whereby each voice signal transmitted over the common transmission channel is preceded by a time interval equal to said second duration;

means included in said data source for generating and transmitting a keying signal to herald subsequent data transmission;

receiver means, connected to a data sink and a voice sink, for receiving the composite data and voice signal transmitted over said common transmission channel, said receiver means having two states, a data state for passing received data signals to said data sink and a voice state for passing received voice signals to said voice sink;

a first gap detector responsive to gaps of said predetermined second duration in said composite data-voice signal for switching said receiver means to said voice state;

a second gap detector responsive to gaps in said voice-data signals which equal said predetermined first duration, for inhibiting said receiver means from passing any signals to said voice sink; and means responsive to said keying signal heralding the receipt of data signals for switching said receiver to a data state, whereby any data signals received are passed to said data sink.

2. A voice-data multiplexing system in which voice signals from a voice source and data signals from a data source are time-multiplexed over a common transmission channel, as a composite voice-data signal, comprising:

transmitter means, including a voice source and a data source;

means for normally inhibiting said data source until idle gaps in said voice signals exceed a predetermined first duration;

means responsive to the presence of voice signals for pre-empting any transmission of data from said data source said means including means for resuming the transmission of voice signals a predetermined second duration after the appearance of said voice signals, whereby each voice signal is preceded by a time interval equal to said second duration;

means included in said data source for generating, for transmission, a keying signal to herald subsequent data transmission;

receiver means, connected to a data sink and a voice sink, for receiving the composite data-voice signal transmitted over said common transmission channel;

a first gating means interconnecting said receiver means and said voice sink;

a second gating means interconnecting said receiver means and said data sink;

detecting means responsive to the presence of only said keying signals in said composite voice-data signals for generating a second output signal;

first means responsive to gaps of said predetermined second duration in said composite voice-data signal for producing a first output signal whenever a gap of said second duration exists in said voice-data signals;

switching means responsive to said first and said second output signals for enabling said first gating means when said first output signal is present, and, for enabling said second gating means when said second output signal is present;

second gap detecting means responsive to gaps of said predetermined first duration in said voice-data signal for generating a third, inhibiting signal whenever gaps of at least said first duration are present in said composite voice-data signals, said inhibiting signal thereby inhibiting said first gating means from passing any signals applied thereto, regardless of the presence of said first output signal.

3. Apparatus according to claim 2 further including means at said transmitter for causing said keying signal to endure for a predetermined duration.

4. Apparatus according to claim 3 wherein said keying signal comprises a single frequency signal.

5. Apparatus according to claim 2 wherein said detecting means includes:

filter means for passing only signals having a frequency equal to that of said keying signal and having an output;

means for phase-inverting the output of said filter means;

linear summing means responsive to the phase-inverted output of said filter means and said composite signals for producing an output signal equivalent to the linear sum of said signals; and means responsive to the presence of a signal at the output of said filter means and the absence of a signal from said linear summing means for generating said second output signal at the output of said detecting means.

6. A voice-data multiplexing system in which a transmitter utilizes idle gaps in voice signals for the transmission of data signals over a common transmission channel, comprising:

transmitter means including means for preventing the transmission of any signal over said channel for a predetermined first duration after the appearance of voice signals at said transmitter;

means responsive only to gaps in said voice signal exceeding a predetermined second duration for initiating the transmission of a keying signal to herald subsequent data transmission; and receiver means including means responsive to the absence of signals in said transmission channel for said predetermined first duration for causing said receiver means to gate subsequently received voice signals over said channel to a voice sink;

means responsive to gaps of said second predetermined duration in the signal over said channel for preventing the gating to said voice sink, of any signals subsequently received; and means responsive to said keying signal for causing said receiver means to gate signals subsequently received over said channel to a data sink.

References Cited by the Examiner

UNITED STATES PATENTS

| | | | |
|---|---|---|---|
| 2,207,711 | 7/1940 | Berger et al. | 179—4 |
| 2,207,720 | 7/1940 | Cole et al. | 179—4 |
| 2,629,021 | 2/1953 | Robertson et al. | |
| 2,951,973 | 9/1960 | Atkinson | 328—138 X |

DAVID G. REDINBAUGH, *Primary Examiner.*

J. T. STRATMAN, *Assistant Examiner.*